Sept. 22, 1964  C. W. GILLIATT  3,149,874
AUTOMATIC UNHOOKING DEVICE FOR A CHAIN SLING
Filed July 30, 1963
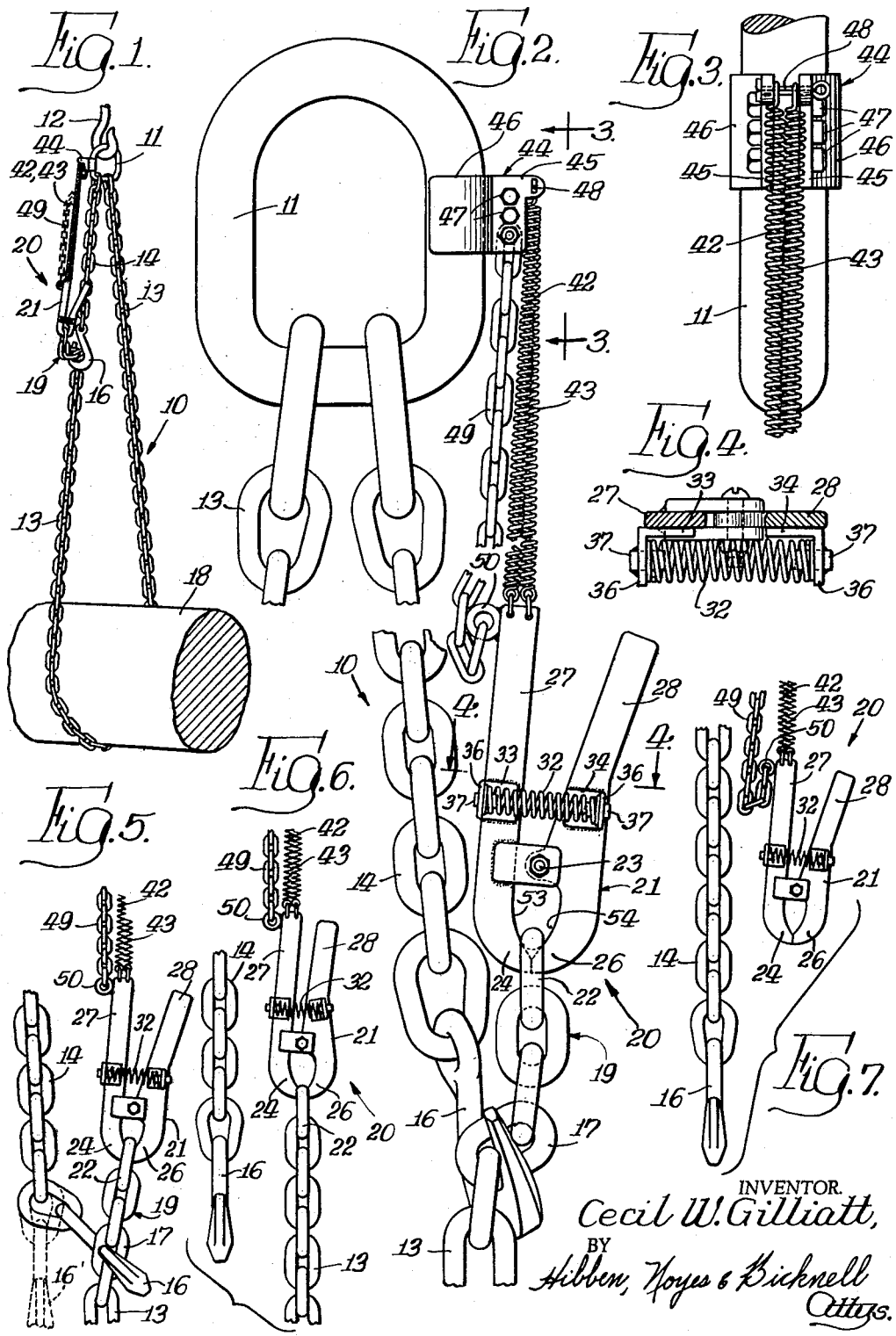
INVENTOR.
Cecil W. Gilliatt,
BY
Hibben, Noyes & Bicknell
Attys.

3,149,874
AUTOMATIC UNHOOKING DEVICE FOR
A CHAIN SLING
Cecil W. Gilliatt, Bridgeview, Ill., assignor to Joseph T. Ryerson & Son, Inc., Chicago, Ill., a corporation of Delaware
Filed July 30, 1963, Ser. No. 298,629
13 Claims. (Cl. 294—75)

This invention relates to chain slings and more particularly relates to a device for automatically unhooking the separable sections of a chain sling when the sling is unloaded.

One of the disadvantages incident to the use of a hoisting sling is the manual effort expended and the time spent to disengage the sling when the load has been set down. This operation is particularly time consuming when the point of unloading of the sling is some distance from the point of loading, and the hoist operator must also connect and disconnect the sling from the load.

Accordingly, it is a general object of the present invention to provide a novel and improved device for automatically unhooking or disengaging the separable sections of a chain sling when the latter is unloaded.

Another object is to provide a novel automatic unhooking device of the foregoing character which is simple in construction, reliable in operation, and economical to manufacture.

A further object of the invention is to provide a novel automatic chain unhooker of the foregoing character which can readily be attached to a conventional chain sling.

Other objects and advantages will be apparent from the following detailed description and accompanying sheet of drawings, in which:

FIG. 1 is a perspective view of a chain sling employing an automatic unhooking device embodying the features of the present invention and showing the sling and unhooking device as they would appear in use when the sling is supporting a load;

FIG. 2 is an enlarged fragmentary front elevational view showing additional details of the unhooking device of FIG. 1;

FIG. 3 is an enlarged fragmentary side elevational view as seen along the line 3—3 of FIG. 2;

FIG. 4 is an enlarged sectional view taken along the line 4—4 of FIG. 2; and

FIGS. 5, 6 and 7 are a series of views showing the various positions of the parts of the sling and unhooking device as the sling is unloaded and the sections thereof are automatically unhooked.

In FIGS. 1 and 2, a typical chain sling 10 is illustrated, the latter being exemplary of one type of sling with which the unhooking device of the present invention, indicated generally at 20, may be used. The sling 10, in the present instance, comprises a connecting member or lifting ring 11, which is adapted to be supported on a hook 12 of an associated hoist (not shown), and a pair of separable chain sections 13 and 14 connected to the ring 11. In the present instance, the section 13 is connected at one end to the ring 11 and is of a longer length than the section 14. The section 14 is also connected at one end to the lifting ring 11 and has a hook 16 at its other end for receiving and releasably retaining a free end portion of the chain section 13 to form the sling and to permit adjustment of the length thereof.

Thus, to form the sling 10, one of the links of the section 13, such as a link 17 (FIG. 2), is inserted edgewise in the usual manner into the bight or throat of the hook 16 so that the links adjacent the link 17 are disposed in locking or keying relation at opposite sides of the hook. The chain section 13 is thus secured to the section 14 so long as the link 17 is disposed in the throat of the hook 16. In FIG. 1 a load 18, such as a portion of a shaft, is shown supported in the sling 10 and it will be understood that the weight of the load retains the link 17 in wedged or locked relation in the hook 16.

In the usual use of the sling 10, the hoist and its associated hook 12 are moved to a position over the load 18 and the other or free end, indicated at 19, of the chain section 13 is passed under or otherwise connected to the load 18 and thereafter engaged with the hook 16, as previously described. Thereafter, the hoist may be raised and the load supported in the sling for movement to another location and subsequent lowering again at an unloading point. When the sling and its load are set down at the unloading point the hoist operator, or someone else, must ordinarily withdraw the keying link 17 from the throat of the hook 16 by hand in order to disengage or separate the chain section 13 from the section 14. Thus considerable time and effort must be expended to effect unhooking of the chain sections 13 and 14 each time the sling 10 is unloaded. Such procedure is particularly time consuming when the hoist and sling must be operated by one person, and the point of use for the load is some distance from its point of lift. Moreover, such operation may be further complicated if the load is being removed from a railroad car, or some similar location, and the hoist operator or unloader has to climb out of the car each time a load is transferred.

To overcome this duplication of effort each time the sling 10 is unloaded and disengaged from a load, the automatic unhooking means or device 20 of the present invention is provided. As best seen in FIG. 2, the unhooking device 20 comprises a clamp 21 adapted to releasably engage the overhanging free end 19 of the section 13, preferably at the last link thereof, as indicated at 22. The clamp 21, in the present instance, comprises a pair of elongated levers which are pivotally connected to each other, as at 23, toward the lower ends of the levers in the manner of reverse-acting pliers. The shorter ends of the levers are inturned to form opposed separable jaws 24 and 26, and the longer portions of the levers form handle portions 27 and 28 for manually separating the jaws 24 and 26, respectively. The handle portion 28 is inclined away from the handle portion 27 to permit greater opening of the jaws 24 and 26.

The jaws 24 and 26 are normally urged toward each other by a coil spring 32 of the compression type. The spring 32 is supported at its ends between a pair of angle brackets 33 and 34 (FIGS. 2 and 4), respectively, mounted on the handle portions 27 and 28, as by welding, so that the flange portions thereof, indicated at 36, extend laterally outwardly from the side of the handle portions. Cylindrical pins or guides 37 are mounted on the flange portions 36 to retain the ends of the spring 32 engaged with the inner surfaces of the flange portions 36.

In order to effect automatic lifting and disengagement of the keying link 17, and consequently the free end 19 of the chain section 13, from the hook 16 when the sling is set down for unloading, suitable spring means is provided for pulling the clamp 21 upwardly. Such spring means, in the present instance, comprises a pair of elongated tension-type coil springs 42 and 43 having their lower ends secured to the upper end of the lever handle portion 27. The upper ends of springs 42 and 43 are connected to a fixed point relative to the hoist hook 12, in this instance a bracket 44 rigidly secured to the lift ring 11. The bracket 44 comprises a pair of parallel flanges 45 having oppositely curved extensions 46 adapted to fit around and grip the ring 11. The bracket 44 is clamped to the ring 11 by means of a plurality of bolts 47 extending between the flanges 45. Thus, the bracket 44 can easily be attached to any conventional sling arrangement.

It will be understood that a single spring could be used in place of the springs 42 and 43, which, in the present instance, are of the conventional screen door type and have been shown by way of example only. The upper ends of the springs 42 and 43 are secured to the bracket 44 by means of a cotter pin 48 extending between the flanges 45.

In addition to springs 42 and 43, snubber means in the form of a length of chain 49 is provided between the clamp 21 and bracket 44 for limiting downward movement of the former relative to the latter. The chain 49 is secured at one end to one of the bolts 47 and at its other end to a ring 50 on the clamp handle 27. The chain 49 preferably has a length somewhat greater than the length of the extended springs 42 and 43 when the clamp is connected to the free end 19 of the chain section 13 and the sling 10 is loaded, as illustrated in FIG. 2. The operation of the snubber chain 49 during unloading of the sling will be described more fully hereinafter.

When the free end 19 of chain section 13 is passed under the load 18 and the link 17 is inserted in the throat of the hook 16, as previously described, the hoist is then raised so that the weight of the load is imposed on the sling 10. The resultant chain tension forces the keying link 17 into the throat of the hook 16 to interlock the chain sections 13 and 14 and thus make it impossible to unhook the sling 10. At this time, the clamp 21 hangs from the bracket 44 in a somewhat elevated position above the hook 16 due to the contracted condition of the springs 42 and 43. The operator then grasps the clamp 21 and pulls it down toward the end link 22 of the overhanging or free end portion 19 of the chain section 13. At the same time, the handle portions 27 and 28 are squeezed together to cause the jaws 24 and 26 to separate and extend around a marginal portion of the link 22 in embracing relation therewith. The handle portions 27 and 28 are then released to permit the jaws 24 and 26 to close in the open interior of the link 22.

Upon release of the handle portions 27 and 28, the springs 23 and 24 pull the clamp 21, and consequently the end link 22 and a portion of the free end 19 or overhang, upwardly or in a direction to disengage the link 17 from the hook 16 (FIG. 2). However, because the sling 10 is loaded, the link 17 cannot be dislodged from the hook 16. The load 18 may thus be raised and supported in the sling 10 or moved to another position in the usual manner. Obviously, the weight of the overhanging portion 19 of the chain section 13 must be less than the force exerted by the springs 42 and 43 tending to raise the overhang and withdraw the link 17 from the hook 16.

Assuming that the load 18 has been moved to a desired location and is ready to be unloaded, the hoist is lowered in the usual manner until the sling 10 and its load are supported on the ground or other unloading point, thereby causing slack in the chains. As the slack increases, the springs 42 and 43 acting through the clamp 21 begin to pull the free end 19 of the chain section 13 upwardly, as shown in full lines in FIG. 5. Such movement continues until the link 17 is completely disengaged whereupon the hook 16 will hang free, as shown by its dotted line position in FIG. 5 and indicated at 16'. The end link 22 remains engaged with the clamp 21 at this time, because the spring 32 is sufficiently strong to prevent separation of the jaws 24 and 26.

When the operator sees that the end 19 of the chain section 13 is free of the hook 16, he then causes the hoist to again lift to take up the slack in the sling 10. When all of the slack is removed from the sling, the springs 42 and 43 will begin to elongate, due to the upward movement of the lift ring 11. At the same time, slack is being removed from the snubber chain 49. Continued upward movement of the lift ring 11 ultimately removes all slack from the snubber chain 49 and at this time the jaws 24 and 26 of the clamp 21 are subjected to a spreading force exceeding that exerted by the spring 32 holding the jaws 24 and 26 engaged so that the jaws 24 and 26 separate, in the manner illustrated in FIG. 6. The clamp 21 thus pulls free of the end link 22.

In order to facilitate such separation of the jaws 24 and 26, the inner edges thereof are preferably formed with inclined cam surfaces 53 and 54, respectively, which coact with the rounded contours of the link 22. With the load removed from the clamp 21, the springs 42 and 43 contract and pull the clamp 21 upwardly to its inoperative elevated position above the hook 16, as illustrated in FIG. 7.

Continued upward movement of the hoist, or traverse thereof, pulls the free end 19 of the chain section 13 from around the load 18 so that the sling may be moved into position for reloading.

It will be understood that more than one sling 10 could be provided on a single lifting ring, such as the lifting ring 11, and that various alternate constructions could be employed for the clamp 21.

I claim:

1. In a chain hoist of the type comprising a suspended hook and a depending chain adapted to form a load-supporting sling with a portion of said chain detachably connected to said hook, the improvement comprising releasable attachment means adapted to be temporarily connected to the free end of said chain when a load is supported in said sling and said chain is thereby tensioned and a portion of the chain adjacent the free end is held in tight engagement with said hook, and automatic retracting means connected to said attachment means for exerting an upward lifting action on said free end of said chain, said lifting action exerted by said retracting means being ineffective to disengage the hook engaging portion of said chain from said hook when said sling is supporting a load and said chain is tensioned but being sufficient to lift the hook engaging portion of said chain automatically from said hook when the sling and its load are set down and said chain is slackened, and said attachment means being releasable thereafter from said free end of said chain in response to opposite pulling movement therebetween.

2. In a chain hoist of the type comprising a suspended hook and a depending chain adapted to form a load-supporting sling with a portion of said chain detachably connected to said hook, the improvement comprising resiliently spreadable clamp means adapted to be releasably engaged with the free end of said chain when a load is supported in said sling and said chain is thereby tensioned and a portion of the chain adjacent the free end is thereby held in tight engagement with said hook, elongated extensible spring means having one end anchored above said hook and its opposite end connected to said clamp means, said spring means being extensible for temporarily engaging said clamp means with said free end of said chain whereby said spring means exerts an upward lifting action on said free ned of said chain, said lifting action being ineffective to disengage the hook engaging portion from said hook while said sling is supporting a load and said chain is tensioned but being sufficient to lift the hook engaging portion automatically from said hook when the sling and its load are set down and said chain is slackened, and means for limiting the extension of said spring means whereby said clamp means is thereafter releasable from said free end of said chain in response to opposite pulling movement therebetween.

3. An automatic unhooking device for use with a chain hoist of the type having a lift ring, a hook suspended from the ring, and a chain depending from the ring, a portion of the chain being detachably connectable with the hook to provide a load-supporting sling; said device comprising a bracket having means for detachably but rigidly mounting the same on the lift ring, elongated extensible spring means connected at one end to said bracket, clamp means affixed to the opposite end of said spring means, and elongated flexible but non-yieldable snubber means interconnecting said bracket and said clamp means for limiting the extension of said spring means, said clamp means being releasably engageable with the free end of the chain upon extension of said spring means when the sling is supporting a load and the extended spring means being effective to lift the hook engaging portion of the chain from the hook when the sling and its load are set down, and said clamp means thereafter being releasable from the free end of the chain by pulling movement therebetween.

4. In a hoisting sling including a connecting member adapted to be connected to a hoist or the like, a chain having one end connected to said connecting member, and hook means carried by said connecting member for detachably receiving a portion of said chain to provide said sling; means for effecting automatic disengagement of said chain from said hook means when said sling is set down comprising clamp means adapted to engage an unloaded free end portion of said chain overhanging said hook means, and spring means having one end connected to said clamp means and its other end connected to a fixed point relative to said connecting member, whereby said spring means is effective when said sling is set down to cause said clamp means to disengage said portion of said chain from said hook means, said clamp means thereafter being releasable by pulling the same away from said free end portion of said chain to wholly release the latter.

5. The structure of claim 4 further characterized in that said other end of said spring means is connected to said connecting member.

6. The structure of claim 4 further characterized in that said clamp means includes a pair of opposed movable jaws and a spring urging said jaws toward each other, said spring being operable to maintain said jaws engaged with a link of the free end portion of said chain when said spring means effects disengagement of said chain from said hook means, said spring being yieldable to permit said jaws to open and release said free end portion of said chain.

7. The structure of claim 6 further characterized in that said jaws include inclined cam surfaces adapted to coact with a portion of said link to facilitate separation of said jaws during release of said clamp means from said chain.

8. The structure of claim 4 further characterized in that said clamp means comprises a pair of pivotally connected levers having jaws formed at one end thereof, the other ends of said levers forming handles facilitating manual separation of said jaws and engagement thereof with said free end portion of said chain.

9. The structure of claim 8 further characterized in that said one end of said spring means is connected to one of said handles.

10. In a hoisting chain sling including a lifting ring adapted to be connected to a hoist or the like, a chain having one end connected to said lifting ring, and a hook carried by said lifting ring and adapted to receive a portion of said chain to provide said sling; means for effecting automatic disengagement of said chain from said hook when said sling is set down, comprising releasable clamp means adapted to engage the free end of said chain when said sling is supporting a load, extensible spring means having one end connected to said clamp means and its other end connected to said lifting ring, and elongated snubber means interconnecting said clamp means and said lifting ring to limit the extension of said spring means and movement of said clamp means away from said lifting ring, whereby said spring means acting through said clamp means is operable to effect disengagement of said chain from said hook when said sling is set down, said snubber means thereafter being effective after disengagement of said chain from said hook to cause said clamp means to release said chain upon relative pulling movement therebetween.

11. The structure of claim 10 further characterized by the provision of bracket means detachably secured to said lifting ring, said bracket means providing a mounting for said one end of said spring means and for said snubber means.

12. The structure of claim 10 further characterized in that said snubber means comprises an elongated unyielding flexible member having a length greater than the length of said spring means when the former is engaged with the free end of said chain.

13. A hoisting chain sling adapted to automatically separate during unloading thereof, comprising a lifting ring adapted to be connected to a hoist or the like, a lifting chain having one end connected to said lifting ring, a hook carried by said lifting ring and adapted to releasably receive a portion of said lifting chain to define said sling, releasable spring biased clamp means adapted to be connected to the free end of said chain when the latter is engaged with said hook, extensible spring means connecting said clamp means with said lifting ring, said spring means being effective when said sling is set down to cause disengagement of the free end of said chain from said hook, and snubber means providing a flexible non-yieldable connection between said clamp means and said lifting ring, said snubber means being effective after disengagement of said chain from said hook to cause said clamp means to release said chain in response to pulling movement therebetween.

References Cited in the file of this patent

UNITED STATES PATENTS

| | | |
|---|---|---|
| 2,385,338 | Allerton | Sept. 25, 1945 |
| 3,129,031 | Bryant | Apr. 14, 1964 |